(12) United States Patent
Tamura et al.

(10) Patent No.: US 12,295,066 B2
(45) Date of Patent: May 6, 2025

(54) AMF NODE AND METHOD THEREOF

(71) Applicant: NEC Corporation, Tokyo (JP)

(72) Inventors: Toshiyuki Tamura, Tokyo (JP); Tsuyoshi Takakura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 381 days.

(21) Appl. No.: 17/629,610

(22) PCT Filed: Dec. 18, 2020

(86) PCT No.: PCT/JP2020/047499
§ 371 (c)(1),
(2) Date: Jan. 24, 2022

(87) PCT Pub. No.: WO2021/132096
PCT Pub. Date: Jul. 1, 2021

(65) Prior Publication Data
US 2022/0248497 A1    Aug. 4, 2022

(30) Foreign Application Priority Data

Dec. 26, 2019  (JP) ................. 2019-237392

(51) Int. Cl.
*H04W 12/06*    (2021.01)
*H04W 12/08*    (2021.01)
*H04W 76/34*    (2018.01)

(52) U.S. Cl.
CPC ........... *H04W 76/34* (2018.02); *H04W 12/06* (2013.01); *H04W 12/08* (2013.01)

(58) Field of Classification Search
CPC .............................. H04W 76/34; H04W 12/08
USPC .......................................................... 370/328
See application file for complete search history.

(56) References Cited

U.S. PATENT DOCUMENTS

| | | | |
|---|---|---|---|
| 2018/0192390 A1 | 7/2018 | Li et al. | |
| 2019/0182875 A1 | 6/2019 | Talebi Fard et al. | |
| 2020/0413241 A1* | 12/2020 | Park | H04W 76/22 |
| 2022/0201787 A1* | 6/2022 | Kawasaki | H04W 48/18 |

FOREIGN PATENT DOCUMENTS

| | | | | |
|---|---|---|---|---|
| CN | 108234401 A | * | 6/2018 | ........ H04L 63/0807 |
| CN | 110169140 A | | 8/2019 | |
| CN | 115735371 A | * | 3/2023 | ............ H04W 12/06 |
| WO | 2019/160390 A1 | | 8/2019 | |
| WO | 2022/072690 A1 | | 4/2022 | |

OTHER PUBLICATIONS

Extended European Search Report for EP Application No. 20905450. 1, dated on Sep. 28, 2022.

(Continued)

*Primary Examiner* — Sibte H Bukhari
(74) *Attorney, Agent, or Firm* — Sughrue Mion, PLLC

(57) ABSTRACT

In response to revocation of authorization of a first network slice identifier for a User Equipment (UE) (1), an Access and Mobility Management Function (AMF) node (2) initiates a release procedure to release a PDU session associated with the first network slice identifier. This makes it possible, for example, to properly manage a Protocol Data Unit (PDU) session associated with a network slice when authorization for that network slice is revoked.

9 Claims, 10 Drawing Sheets

(56) References Cited

OTHER PUBLICATIONS

Ericsson: "NSSAA pending, prevent UE to wait indefinitely", 3GPP Draft; C1-198420, Nov. 4, 2019.
Samsung: "AMF triggers PDU session release", 3GPP Draft; C1-202122, Mar. 30, 2020.
CN Office Action for CN Application No. 202080057518.2, mailed on Sep. 27, 2023 with English Translation.
International Search Report for PCT Application No. PCT/JP2020/047499, mailed on Mar. 23, 2021.
3GPP TS 23.501 V16.2.0 (Sep. 2019) "3rd Generation Partnership Project: Technical Specification Group Services and System Aspects; System Architecture for the 5G System (5GS); Stage 2(Release 16)", Sep. 2019, pp. 1-382.
3GPP TS 23.502 V16.2.0 (Sep. 2019) "3rd Generation Partnership Project: Technical Specification Group Services and System Aspects; Procedures for the 5G System (5GS): Stage 2 (Release 16)", Sep. 2019, pp. 1-518.
3GPP TS 24.501 V16.2.0 (Sep. 2019) "3rd Generation Partnership Project: Technical Specification Group Core Network and Terminals; Non-Access-Stratum (NAS) protocol for 5G System (5GS); Stage 3 (Release 16)", Sep. 2019, pp. 1-601.
C1-199044, InterDigital et al., "Introduction of pending NSSAI for network slice-specific authentication and authorization", 3GPP TSG-CT WG1 Meeting #121, Reno (NV), USA, Nov. 11-15, 2019. pp. 1-40.
S2-1912488, China Mobile et al., "Service used for slice-specific re-authentication and revocation", 3GPP TSG-SA WG2 Meeting #136, Reno NV, USA, Nov. 18-22, 2019, pp. 1-3.
JP Office Action for Japanese Patent Application No. 2021-567408, mailed on Apr. 30, 2024 with English Translation.
3GPP TS 24.501 V16.3.0, Dec. 20, 2019, pp. 1-644.

\* cited by examiner

AMF NODE AND METHOD THEREOF

This application is a National Stage Entry of PCT/JP2020/047499 filed on Dec. 18, 2020, which claims priority from Japanese Patent Application 2019-237392 filed on Dec. 26, 2019, the contents of all of which are incorporated herein by reference, in their entirety.

TECHNICAL FIELD

The present disclosure relates to cellular networks, and in particular to management of an association (e.g., a Protocol Data Unit (PDU) session) between a radio terminal and a data network.

BACKGROUND ART

The 5G system (5GS) connects a radio terminal (user equipment (UE)) to a Data Network (DN). In the 5G architecture, connectivity services between the UE and the DN are supported by one or more Protocol Data Unit (PDU) sessions (see, for example, Non-Patent Literature 1-3). A PDU session is an association, session, or connection between the UE and the DN. A PDU session is used to provide a PDU connectivity service (i.e., an exchange of PDUs between the UE and the DN). A PDU session is established between the UE and a User Plane Function (UPF) (i.e., PDU session anchor) to which the DN is connected. In terms of data transfer, a PDU session consists of a tunnel (N9 tunnel) in the 5G core network (5GC), a tunnel (N3 tunnel) between the 5GC and an Access Network (AN), and one or more radio bearers.

Non-Patent Literature 2 (3GPP TS 23.502) and Non-Patent Literature 3 (3GPP TS 24.501) specify a PDU session establishment procedure and a PDU session release procedure. More specifically, the PDU session establishment procedure is described in, for example, section 4.3.2.2 of Non-Patent Literature 1 and section 6.4.1 of 3 Non-Patent Literature 2. The PDU session release procedure is described in, for example, section 4.3.4.2 of Non-Patent Literature 1 and sections 6.3.3 and 6.4.3 of Non-Patent Literature 2.

The 5GS also supports network slicing (see, for example, Non-Patent Literature 1 to 3, especially Section 5.15 of Non-Patent Literature 1). Network slicing use Network Function Virtualization (NFV) and software-defined networking (SDN) technologies, thereby creating multiple virtualized logical networks on top of physical networks. Each virtualized logical network is called a network slice. A network slices provides specific network capabilities and network characteristics. In order to form a single network slice, a network slice instance (NSI) is defined as a set of network function (NF) instances, resources (e.g., computer processing resources, storage, and networking resources), and an access network (AN) (at least one of a Next Generation Radio Access Network (NG-RAN) and a Non-3GPP Interworking Function (N3IWF)).

A network slice is identified by an identifier known as Single Network Slice Selection Assistance Information (S-NSSAI). The S-NSSAI consists of a Slice/Service type (SST) and a Slice Differentiator (SD). The SST refers to the expected network slice behavior in terms of features and services. The SD is optional information and complements the SST to differentiate amongst multiple network slices of the same Slice/Service type.

An S-NSSAI can have standard values or non-standard values. Currently, standard SST values 1, 2, 3, and 4 are associated respectively with enhanced Mobile Broad Band (eMBB), Ultra Reliable and Low Latency Communication (URLLC), Massive Internet of Things (MIoT), and Vehicle to Everything (V2X) slice types. A non-standard value of an S-NSSAI with identifies a single network slice within a specific Public Land Mobile Network (PLMN). In other words, non-standard values are PLMN-specific values, and associated with the PLMN ID of a PLMN that has assigned them. Each S-NSSAI ensures network isolation by selecting a particular NSI. A NSI may be selected via different S-NSSAIs. An S-NSSAI may be associated with different NSIs. A network slice may be uniquely identified by an S-NSSAI.

There are two types of S-NSSAI, known as S-NSSAI and Mapped S-NSSAI. An S-NSSAI identifies a network slice served by a Public Land Mobile Network (PLMN) in which a UE is registered. A Mapped S-NSSAI may be an S-NSSAI of a Home PLMN (HPLMN) that is mapped to (associated with, or applicable to) an S-NSSAI that identifies a network slice of a roaming network when a UE is roaming, and also an S-NSSAI that is included in the subscription information of the UE. Thereafter, S-NSSAI and Mapped S-NSSAI may be collectively referred to as simply S-NSSAI in this specification.

Meanwhile, Network Slice Selection Assistance Information (NSSAI) means a set of S-NSSAIs. Accordingly, one or more S-NSSAIs can be included in one NSSAI. There are multiple types of NSSAI, known as Configured NSSAI, Requested NSSAI, Allowed NSSAI, Rejected NSSAI, and Pending NSSAI.

A Configured NSSAI includes one or more S-NNSAIs each applicable to one or more PLMNs. For example, The Configured NSSAI is configured by a Serving PLMN and is applied to the Serving PLMN. Alternatively, the Configured NSSAI may be a Default Configured NSSAI. The Default Configured NSSAI is configured by the Home PLMN (HPLMN) and applies to any PLMNs for which no specific Configured NSSAI has been provided. For example, a radio terminal (User Equipment (UE)) is provisioned with the Default Configured NSSAI from a Unified Data Management (UDM) of the HPLMN via an Access and Mobility Management Function (AMF).

A Requested NSSAI is signaled by a UE to a network in, for example, a registration procedure, allowing the network to determine a serving AMF, at least one network slice and at least one NSIs, for this UE.

An allowed NSSAI is provided to a UE by a Serving PLMN and indicates one or more S-NSSAIs that the UE can use in the current Registration Area of the Serving PLMN. The Allowed NSSAI is determined by an AMF of the Serving PLMN, for example, during a registration procedure. Accordingly, the Allowed NSSAI is signaled to the UE by the network (i.e., AMF) and stored in (non-volatile) memories of both the AMF and the UE.

A Rejected NSSAI includes one or more S-NSSAIs rejected by the current PLMN. The Rejected NSSAI may be referred to as rejected S-NSSAIs. A S-NSSAI is rejected throughout the current PLMN or rejected in the current registration area. If an AMF rejects any of one or more S-NSSAIs included in the Requested NSSAI, for example, in a registration procedure of a UE, it includes them in the Rejected NSSAI. The Rejected NSSAI is signaled to the UE by the network (i.e., AMF) and stored in (non-volatile) memories of both the AMF and the UE.

A Pending NSSAI is newly agreed upon in the 3rd Generation Partnership Project (3GPP) (see Non-Patent Literature 4). A Pending NSSAI indicates one or more S-NSSAIs for which Network Slice-Specific Authentication and Authorization (NSSAA)) is pending. A Serving PLMN shall perform NSSAA for S-NSSAIs of the HPLMN which are subject to NSSAA based on subscription information. In order to perform NSSAA, an AMF invokes an Extensible Authentication Protocol (EAP)-based authorization procedure. The EAP-based authentication procedure takes a relatively long time to obtain its outcome. Accordingly, whilst the AMF determines an Allowed NSSAI as described above during a registration procedure of a UE, it does not include S-NSSAIs subject to NSSAA in the Allowed NSSAI, but instead them in the Pending NSSAI. The Pending NSSAI is signaled to the UE by the network (i.e., AMF) and stored in (non-volatile) memories of both the AMF and the UE.

An AMF manages a UE context for a UE in Registration Management (RM)-REGISTERED state. The UE context may be referred to as, but is not limited to, a Mobility Management (MM) context. The UE context may include one or more of the Allowed NSSAI, Rejected NSSAI, and Pending NSSAI described above. Additionally or alternatively, the UE context may include information indicating the status of the S-NSSAIs included in one or more of the Allowed NSSAI, Rejected NSSAI, and Pending NSSAI described above. Specifically, the information indicating the status of the S-NSSAIs may be information indicating whether each S-NSSAI is deactivated or activated. Alternatively, the information indicating the status of the S-NSSAIs may be information indicating whether each S-NSSAI is invalid or valid. On the other hand, the UE manages a UE NSSAI configuration, which includes the Configured NSSAI, Allowed NSSAI, Rejected NSSAI, and Pending NSSAI described above. The UE NSSAI configuration is stored in a non-volatile memory in the UE (Mobile Equipment (ME) except Universal Subscriber Identity Module (USIM)). The memory or memory area where the UE NSSAI configuration is stored is referred to as NSSAI storage.

Section 5.15.10 of Non-Patent Literature 1 (3GPP TS 23.501) and Section 4.2.9 of Non-Patent Literature 2 (3GPP TS 23.502) specify the Network Slice-Specific Authentication and Authorization (NSSAA). More specifically, section 5.15.10 of Non-Patent Literature 1 and section 4.2.9.2 of Non-Patent Literature 2 describe the NSSAA. Section 5.15.10 of Non-Patent Literature 1 and Section 4.2.9.3 of Non-Patent Literature 2 describe the re-authentication and re-authorization triggered by an Authentication, Authorization and Accounting (AAA) server (AAA-S). Section 5.15.10 of Non-Patent Literature 1 and Section 4.2.9.4 of Non-Patent Literature 2 describe the revocation of Slice-Specific Authorization triggered by an AAA server. In addition, Non-Patent Literature 5 describes a proposed amendment to the revocation of Slice-Specific Authorization as specified in section 4.2.9.4 of Non-Patent Literature 2.

CITATION LIST

Non Patent Literature

[Non-Patent Literature 1] 3GPP TS 23.501 V16.2.0 (2019-09) "3rd Generation Partnership Project; Technical Specification Group Services and System Aspects; System Architecture for the 5G System (5GS); Stage 2 (Release 16)", September 2019

[Non-Patent Literature 2] 3GPP TS 23.502 V16.2.0 (2019-09) "3rd Generation Partnership Project; Technical Specification Group Services and System Aspects; Procedures for the 5G System (5GS); Stage 2 (Release 16)", September 2019

[Non-Patent Literature 3] 3GPP TS 24.501 V16.2.0 (2019-09) "3rd Generation Partnership Project; Technical Specification Group Core Network and Terminals; Non-Access-Stratum (NAS) protocol for 5G System (5GS); Stage 3 (Release 16)", September 2019

[Non-Patent Literature 4] InterDigital, ZTE, vivo, NEC, "Introduction of pending NSSAI for network slice-specific authentication and authorization", C1-199044, 3GPP TSG-CT WG1 Meeting #121, Reno (NV), USA, 11-15 Nov. 2019

[Non-Patent Literature 5] China Mobile, Nokia, Ericsson, Telecom Italia, "Service used for slice-specific re-authentication and revocation", S2-1912488, 3GPP TSG-SA WG2 Meeting #136, Reno NV, USA, 18-22 Nov. 2019

SUMMARY OF INVENTION

Technical Problem

As mentioned above, section 4.2.9.4 of Non-Patent Literature 2 describes the revocation of a Slice-specific Authorization triggered by the AAA server (AAA-S). In this procedure, the AAA server (AAA-S) requests revocation of authorization for a network slice identified by a particular S-NSSAI, and the AMF signals the UE to update the UE NSSAI configuration (NSSAI storage), thereby removing the S-NSSAI from the current allowed NSSAI.

However, if there is an already established PDU session associated with the network slice for which the Slice-Specific Authorization is being revoked, it is not clear how this PDU session is to be handled.

One of the objects to be attained by embodiments disclosed herein is to provide apparatuses, methods, and programs that contribute to appropriately managing a PDU session associated with a network slice when the authorization of that network slice is revoked. It should be noted that this object is merely one of the objects to be attained by the embodiments disclosed herein. Other objects or problems and novel features will be made apparent from the following description and the accompanying drawings.

Solution to Problem

In a first aspect, an AMF includes at least one memory and at least one processor coupled to the at least one memory. The at least one processor is configured to, in response to revocation of authorization of a first network slice identifier for a UE, initiate a release procedure to release a PDU session associated with the first network slice identifier.

In a second aspect, a method in an AMF includes, in response to revocation of authorization of a first network slice identifier for a UE, initiating a release procedure to release a PDU session associated with the first network slice identifier.

In a third aspect, a UE includes at least one memory and at least one processor coupled to the at least one memory. The at least one processor is configured to, in response to revocation of authorization of a first network slice identifier for the UE, request a network to release a PDU session associated with the first network slice identifier.

In a fourth aspect, a method in a UE includes, in response to revocation of authorization of a first network slice identifier for the UE, requesting a network to release a PDU session associated with the first network slice identifier.

In a fifth aspect, a program includes instructions (software codes) that, when loaded into a computer, cause the computer to perform the method according to the above-described second or fourth aspect.

Advantageous Effects of Invention

According to the above-described aspects, it is possible to provide apparatuses, methods, and programs that contribute to appropriately managing a PDU session associated with a network slice when the authorization of that network slice is revoked.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and contribute to obtaining advantages different from one another.

The following descriptions on the embodiments mainly focus on the 3rd Generation Partnership Project (3GPP) fifth generation mobile communication system (5G system (5GS)). However, these embodiments may be applied to other cellular communication systems that support network slicing similar to that of the 5GS.

First Embodiment

Figure 1:
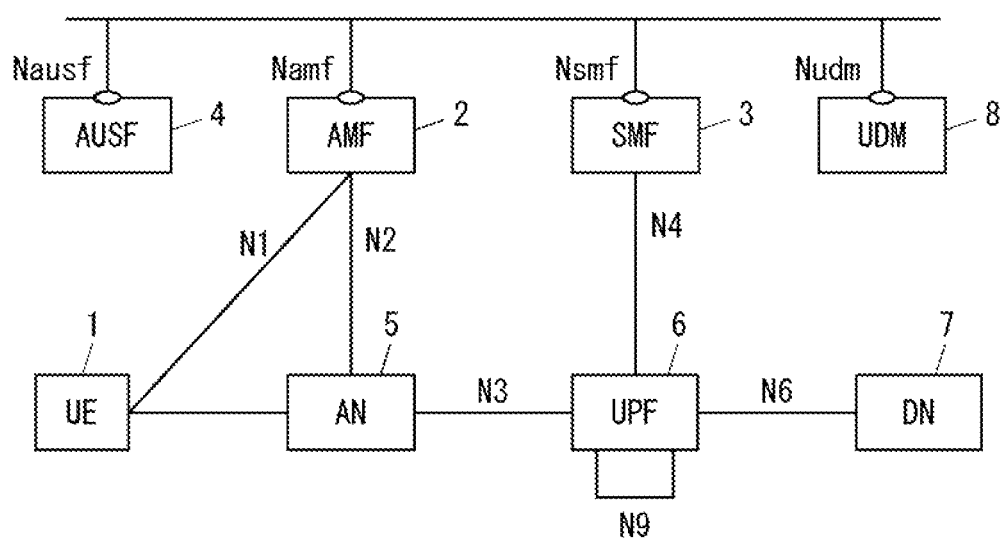
FIG. 1 is a diagram showing a configuration example of a cellular network according to an embodiment.

FIG. 1 shows a configuration example of a cellular network (i.e., 5GS) according to the present embodiment. Each of the elements shown in FIG. 1 is a network function and provides an interface as defined by the 3rd Generation Partnership Project (3GPP). Each of the elements (network functions) shown in FIG. 1 can be implemented, for example, as a network element on dedicated hardware, as a software instance running on dedicated hardware, or as a virtual function instantiated on an application platform.

The cellular network shown in FIG. 1 may be provided by a Mobile Network Operator (MNO), or it may be a Non-Public Network (NPN) provided by a non-MNO. If the cellular network shown in FIG. 1 is an NPN, it may be an independent network, represented as a Stand-alone Non-Public Network (SNPN), or it may be an NPN linked to an MNO network, represented as a public network integrated NPN.

A radio terminal (i.e., UE) 1 uses 5G connectivity services and communicates with a data network (DN) 7. More specifically, the UE 1 is connected to an access network (i.e., 5G Access Network (5GAN)) 5 and communicates with the DN 7 via a User Plane Function (UPF) 6 in a core network (i.e., 5G core network (5GC)). The AN 5 may include a Next Generation Radio Access Network (NG-RAN) or a non-3GPP AN, or both. The non-3GPP AN may be a network that handles wireless LAN (WiFi) communications or a network that handles wired communications, referred to as a Wireline 5G Access Network (W-5GAN). The UPF 6 may include multiple UPFs that are interconnected.

The UE1 establishes one or more PDU sessions between the UE 1 and the UPF 6 (i.e., the PDU session anchor) to which the DN 7 is connected. As already explained, a PDU session is an association, session, or connection between the UE and the DN. A PDU session is used to provide a PDU connectivity service (i.e., an exchange of PDUs between the UE 1 and the DN 7). In terms of data transfer, a PDU session consists of a tunnel (N9 tunnel) in the 5GC, a tunnel (N3 tunnel) between the 5GC and the AN 5 and one or more radio bearers. Although not shown in FIG. 1, the UE 1 may establish multiple PDU sessions with multiple UPFs (PDU session anchors) 6 in order to concurrently access multiple DNs 7.

The AMF 2 is one of the network functions in the 5GC Control Plane. The AMF 2 provides the termination of a RAN Control Plane (CP) interface (i.e., N2 interface). The AMF 2 terminates a single signalling connection (i.e., N1 NAS signalling connection) with the UE 1 and provides registration management, connection management, and mobility management. The AMF 2 provides NF services to NF consumers (e.g., other AMFs, Session Management Function (SMF) 3, and Authentication Server Function (AUSF) 4) on a service-based interface (i.e., Namf interface). The NF services provided by the AMF 2 include a communication service (Namf_Communication). The communication service allows NF consumers (e.g., SMF 3) to communicate with the UE 1 or AN 5 via the AMF 2.

The SMF 3 is one of the network functions in the 5GC Control Plane. The SMF 3 manages PDU sessions. The SMF 3 sends and receives SM signalling messages (NAS-SM messages, N1 SM messages) to and from the Non-Access-Stratum (NAS) Session Management (SM) layer of the UE 1 via communication services provided by the AMF 2. The SMF 3 provides NF services on a service-based interface (i.e., Nsmf interface) to NF consumers (e.g., AMF 2, other SMFs). The NF services provided by the SMF 3 include a PDU session management service (Nsmf_PDUSession), which allows the NF consumer (e.g., AMF 2) to handle PDU sessions. The SMF 3 may be an Intermediate SMF (I-SMF). The I-SMF is inserted between the AMF 2 and an original SMF 3 as needed when the UPF 6 belongs to a different SMF service area and cannot be controlled by the original SMF.

The AUSF 4 is one of the network functions in the 5GC Control Plane. The AUSF 4 provides NF services on a service based interface (i.e., Nausf interface) to NF consumers (e.g., AMF 2, UDM 8). The NF services provided by the AUSF 4 include a UE authentication service (e.g., Nausf_UEAuthentication and Nausf_NSSAA_Authenticate). The Nausf_UEAuthentication service provides UE authentication and related key information (keying material) to the NF consumer (i.e., AMF). More specifically, the AUSF 4 cooperates with the UDM 8 and Authentication credential Repository and Processing Function (ARPF) to perform authentication using one of the two authentication methods (i.e., 5G-Authentication and Key Agreement (AKA) and EAP-based authentication) supported by the 5GS. After performing the authentication, the AUSF 4 replies to the AMF 2 with the authentication result and, if successful, a master key. The master key is used by the AMF 2 to derive NAS security keys and other security key(s). For UE authentication, the AUSF 4 works closely with the UDM 8. The Nausf_NSSAA_Authenticate service provides the NF consumer (e.g., AMF 2) with a Network Slice-Specific Authentication and Authorization service between the UE 1 and an AAA server via the AUSF 4.

The UDM 8 is one of the network functions in the 5GC Control Plane. The UDM 8 provides access to a database (i.e., User Data Repository (UDR)) storing subscriber data (subscription information). The UDM 8 provides NF services on a service-based interface (i.e., Nudm interface) to NF consumers (e.g., AMF 2, AUSF 4, SMF 3). The NF services provided by the UDM 8 include a subscriber data management service, which allows the NF consumer (e.g., AMF) to retrieve subscriber data and provides updated subscriber data to the NF consumer.

The configuration example in FIG. 1 shows only typical NFs for convenience of explanation. The cellular network according to this embodiment may include other NFs not shown in FIG. 1, such as Network Slice Selection Function (NSSF) and Policy Control Function (PCF).

Figure 2:
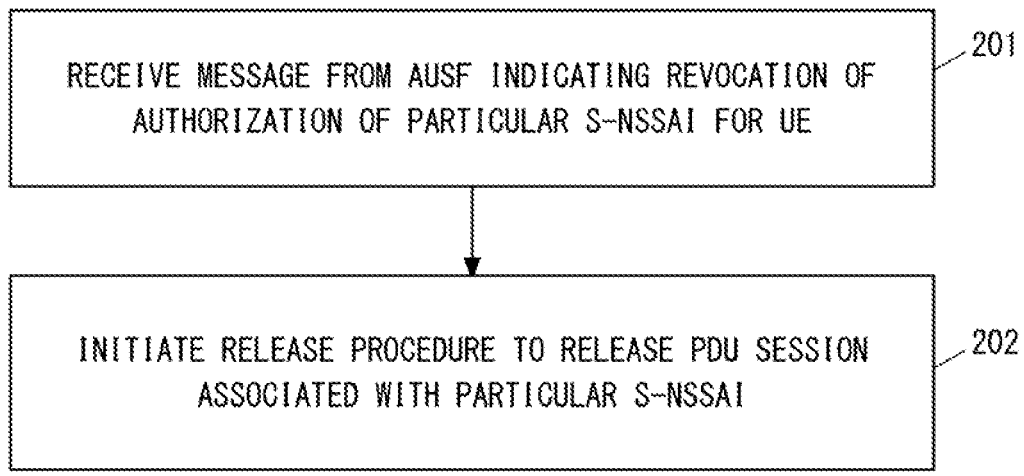
FIG. 2 is a flowchart showing an example of operation of an AMF according to an embodiment.

FIG. 2 is a flowchart showing an example of the operation of the AMF 2. In step 201, the AMF 2 receives a message from the AUSF 4 indicating the revocation of the authorization of a particular S-NSSAI (or network slice identified thereby) for the UE 1. In step 202, the AMF 2 initiates a release procedure to release all the PDU sessions associated with that particular S-NSSAI in response to the revocation of the authorization of that particular S-NSSAI (or network slice identified thereby) for the UE 1. The AMF 2 may initiate a PDU session release procedure in response to the receipt of the revocation message from the AUSF 4.

If a PDU session for an emergency call (e.g., Emergency Service) associated with that particular S-NSSAI has been established, the AMF 2 may be configured to exclude the release of the PDU session for the emergency call from the above release procedure. In other words, in the above release procedure, the AMF 2 may initiate a release procedure to release all the PDU sessions associated with that particular S-NSSAI other than the PDU sessions for emergency calls. A PDU session for emergency call associated with the particular S-NSSAI may mean a PDU session for emergency call in which the particular S-NSSAI is set in the AMF emergency configuration data stored by the AMF 2, the S-NSSAI is notified from the AMF 2 to the SMF 3, and the S-NSSAI is used by the SMF 3 at the time of establishing the PDU session.

According to the PDU session release procedure described in section 4.3.4.2 of Non-Patent Literature 2, the AMF 2 may perform (or invoke) a procedure (e.g., Nsmf_PDUSession_UpdateSMContext (or Nsmf_PDUSession_ReleaseSMContext) service operation) to release one or more PDU sessions associated with the particular S-NSSAI. In this procedure, the AMF 2 may send a message (e.g., Nsmf_PDUSession_UpdateSMContext message) containing a Release Indication to the SMF 3. The AMF 2 may notify the SMF 3 of the PDU session IDs of one or more PDU sessions associated with that S-NSSAI in order to invoke a network-requested PDU session release procedure. The AMF 2 may include these PDU session IDs in the above message, or may inform the SMF 3 of these PDU session IDs by another message. The AMF 2 may include the S-NSSAI in the above message, or may notify the SMF 3 of the S-NSSAI by another message. Alternatively, the AMF 2 may send an Nsmf_PDUSession_ReleaseSMContext message to the SMF 3. The AMF 2 may include in the Nsmf_PDUSession_ReleaseSMContext message the PDU session IDs of one or more PDU sessions associated with that S-NSSAI. The AMF 2 may include the concerned S-NSSAI in the Nsmf_PDUSession_ReleaseSMContext message.

The AMF 2 may inform the SMF 3 of the revocation of the authorization of the particular S-NSSAI (or network slice identified thereby) for the UE 1 in the PDU session release procedure. Specifically, the AMF 2 may send to the SMF 3 a message containing a cause Information Element (IE) indicating the revocation of the authorization for the S-NSSAI (or network slice). The message may be, for example, an Nsmf_PDUSession_UpdateSMContext message (or an Nsmf_PDUSession_ReleaseSMContext message). Alternatively, the AMF 2 may notify the SMF 3 in a separate message from the above message with a cause IE indicating the revocation of the authorization of the S-NSSAI (or network slice).

The operation shown in FIG. 2 allows the AMF 2 to quickly release a PDU session associated with a network slice for which the authorization has been revoked.

Figure 3:
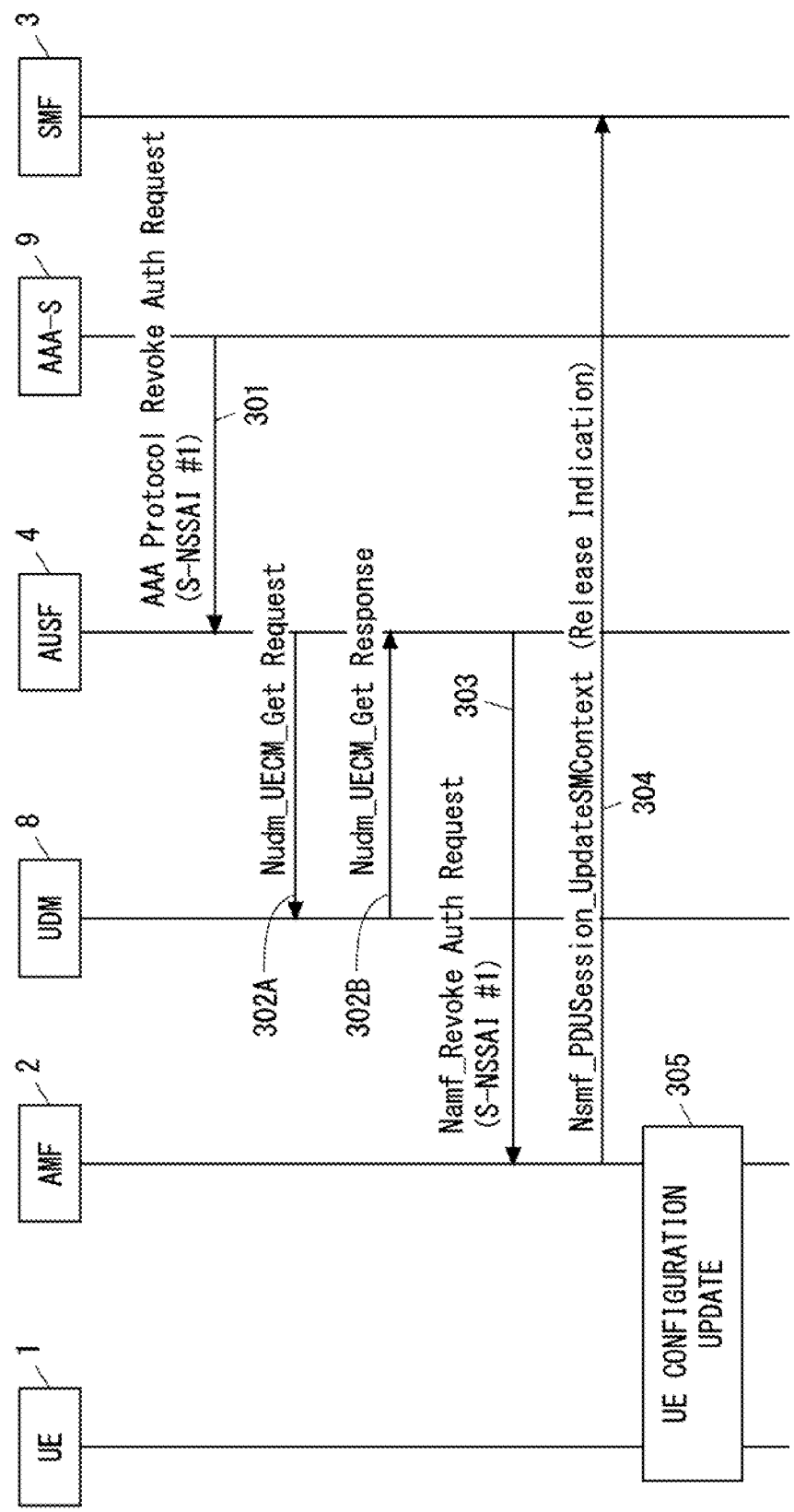
FIG. 3 is a sequence diagram showing an example of operations of a UE, an AMF, an SMF and an AUSF according to an embodiment.

FIG. 3 shows an example of a Slice-Specific Authorization Revocation procedure that is initiated (or triggered) by the AAA-S. In step 301, the AAA-S 9 requests revocation of the authorization for a network slice identified by a particular S-NSSAI (in this case, S-NSSAI #1). Specifically, the AAA-S 9 may send a Revoke Authorization Request message (e.g., AAA Protocol Revoke-Auth Request message) to the AUSF 4. The message indicates S-NSSAI #1 and further indicates the Generic Public Subscription Identifier (GPSI) of the UE 1. The message may be sent directly from the AAA-S 9 to the AUSF 4, or may be sent to the AUSF 4 via an AAA Proxy (AAA-P) not illustrated.

In step 303, the AUSF 4 notifies the AMF 2 via an NF service provided by the AUSF 4 that a revocation event of S-NSSAI #1 authorization for the UE 1 has occurred. Specifically, the AUSF 4 obtains the AMF ID indicating the AMF 2 from the UDM 8 by invoking a procedure (e.g., Nudm_UECM_Get procedure) using the GPSI of the UE 1 contained in the message received in step 301 (steps 302A and 302B). The AUSF 4 may then send a message (e.g., Nausf_NSSAA_Notify message) to the AMF 2 indicated by the AMF ID, indicating that a revocation event of the authorization of S-NSSAI #1 for the UE 1 has occurred. The notification from the AUSF 4 to the AMF 2 indicates S-NSSAI #1 and further indicates the GPSI of the UE 1.

In step 304, if there are PDU sessions of the UE 1 associated with S-NSSAI #1 for which the authorization has been revoked, the AMF 2 performs (or invokes) an Nsmf_PDUSession_UpdateSMContext (or Nsmf_PDUSession_ReleaseSMContext) service operation to release all the PDU sessions of the UE 1 associated with S-NSSAI #1. In this procedure, the AMF 2 sends a message (e.g., Nsmf_P-DUSession_UpdateSMContext message) containing a Release Indication to the SMF 3. The AMF 2 may notify the SMF 3 of the PDU session IDs of one or more PDU sessions associated with that S-NSSAI in order to invoke a network-requested PDU session release procedure. The AMF 2 may include these PDU session IDs in the above message, or may inform the SMF 3 of these PDU session IDs by another message. The AMF 2 may include that S-NSSAI in the above message, or may notify the SMF 3 of the S-NSSAI by another message. Alternatively, the AMF 2 may send an Nsmf_PDUSession_ReleaseSMContext message to the SMF 3. The AMF 2 may include in the Nsmf_PDUSession_ReleaseSMContext message the PDU session IDs of one or more PDU sessions associated with that S-NSSAI. The AMF 2 may include that S-NSSAI in the Nsmf_PDUSession_ReleaseSMContext message. As described above, the message may include a cause IE indicating revocation (e.g., REL_DUE_TO_SLICE_REVOCATION) of the authorization of the S-NSSAI (or network slice). Alternatively, a cause IE indicating the revocation of the authorization (e.g., REL_DUE_TO_SLICE_REVOCATION) of the S-NSSAI (or network slice) may be sent to the SMF3 by a message separate from the above message.

In step 305, the AMF 2 signals the UE 1 to update the UE NSSAI configuration (NSSAI storage) in order to remove S-NSSAI #1, whose authorization has been revoked, from the current allowed NSSAI. Specifically, the AMF 2 sends to the UE 1 a UE Configuration Update Command message indicating that S-NSSAI #1 is to be removed from the Allowed NSSAI and that this is to be included in the Rejected NSSAI. In response to the reception of the UE Configuration Update Command message, the UE 1 updates its UE NSSAI configuration (NSSAI storage) stored in a (non-volatile) memory of the UE 1. Specifically, the UE 1 removes S-NSSAI #1 from the Allowed NSSAI in the UE NSSAI configuration (NSSAI storage) and stores it in the Rejected NSSAI. The UE Configuration Update Command message may contain a cause IE indicating the revocation of the S-NSSAI (or network slice) authorization. The cause IE may be, for example, "S-NSSAI is not available due to the failed or revoked network slice-specific authorization and authentication".

In response to the receipt of the UE Configuration Update Command message, the UE 1 manages S-NSSAI #1 to be included in the Rejected NSSAI as Rejected S-NSSAI. The UE 1 may also store a cause value indicating the cause for the rejection (i.e., the authorization was revoked) in association with S-NSSAI #1. The cause value may be "network slice-specific authorization and authentication failure", or "network slice-specific authorization and authentication revocation".

After the cause of the network slice-specific authorization and authentication failure has been resolved or the cause of the revocation has been resolved, the UE 1 may include a Requested NSSAI that includes S-NSSAI #1 in a registration request message and send the message to the AMF 2 in order to again enjoy the services provided by S-NSSAI #1.

Sometimes the UE 1 or the user of the UE 1 can know the cause of the revocation of the network slice-specific authorization and authentication. Accordingly, the UE 1 or the user of the UE 1 can take steps to the network to resolve the cause. After that, the UE 1 may include a Requested NSSAI including S-NSSAI #1 in a registration request message and send the message to the AMF 2 in order to enjoy the services provided by S-NSSAI #1 again.

The procedure in FIG. 3 may be modified as appropriate. For example, the AMF 2 may request the SMF 3 to release a PDU session after the UE Configuration Update procedure (step 304). For example, before, after, or during the execution of the procedure in FIG. 3, the AMF 2 may inform the UDM 8 of S-NSSAI #1, whose authorization has been revoked. In this case, the AMF 2 may include the information of S-NSSAI #1 whose authorization was revoked in a Nudm_SDM_Info message or a Nudm_SDM_Update message or a UEAuthentication_ResultConfirmation message and send it to the UDM 8. The UDM 8 updates the subscriber data with the information on S-NSSAI #1 whose authorization has been revoked and sends a reply message to the AMF 2.

Figure 4:
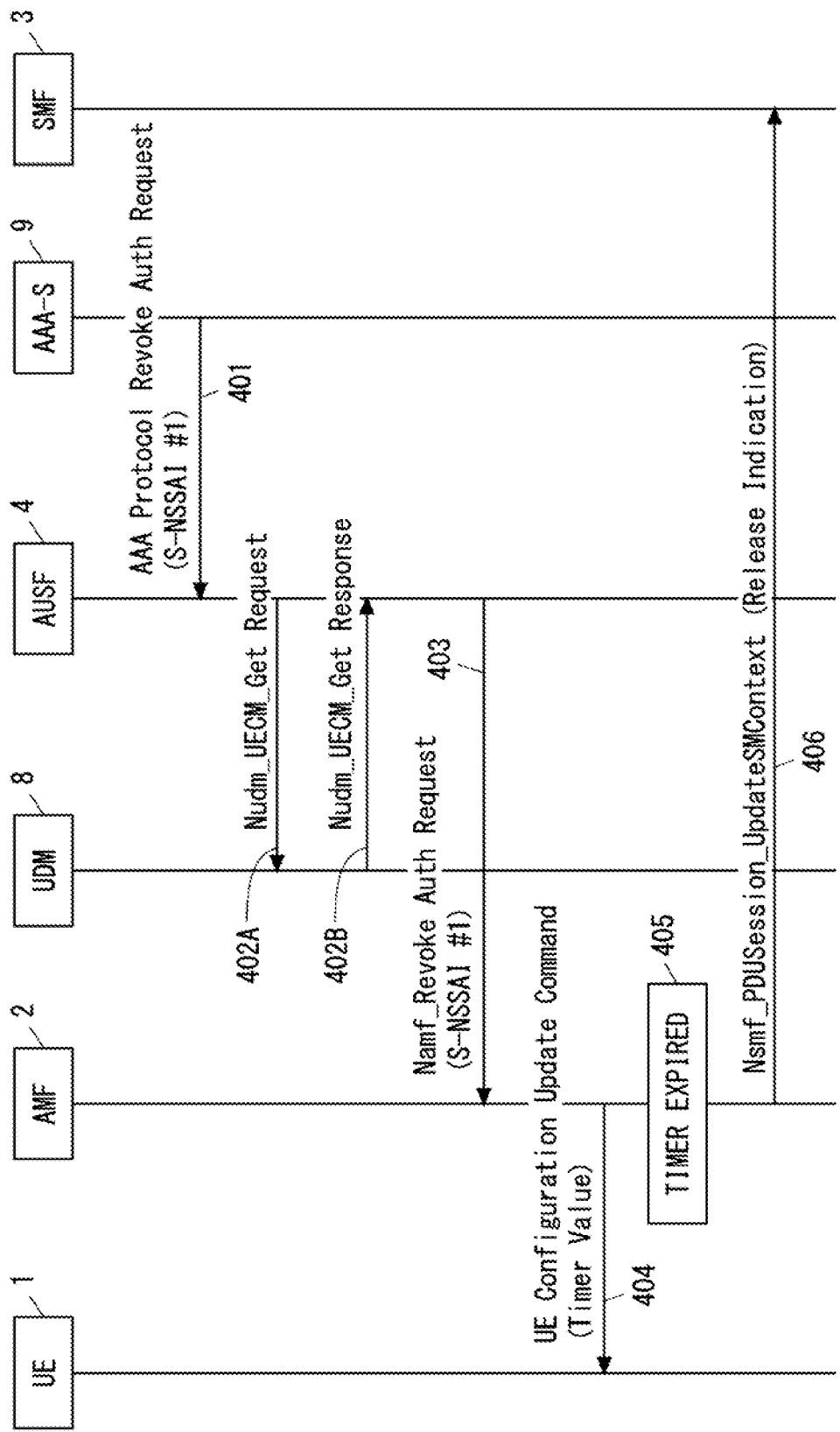
FIG. 4 is a sequence diagram showing an example of operations of a UE, an AMF, an SMF and an AUSF according to an embodiment.

FIG. 4 shows another example of the Slice-Specific Authorization Revocation procedure initiated (or triggered) by the AAA-S. In FIG. 4, the AMF 2 requests the SMF 3 to release a PDU session (step 405) after a UE Configuration Update procedure (step 403).

Steps 401-403 in FIG. 4 are similar to steps 301-303 in FIG. 3. In step 404, the AMF 2 performs the UE Configuration Update procedure in order to remove S-NSSAI #1, whose authorization has been revoked, from the current allowed NSSAI. In the UE Configuration Update procedure, the AMF 2 sends a UE Configuration Update Command message to the UE 1 indicating that S-NSSAI #1 is to be removed from the allowed NSSAI and that this is to be included in the Rejected NSSAI. The UE Configuration Update Command message may contain a cause IE indicating the revocation of the S-NSSAI (or network slice) authorization. The cause IE may be, for example, "S-NSSAI is not available due to the failed or revoked network slice-specific authorization and authentication".

If there are one or more PDU sessions of the UE 1 associated with S-NSSAI #1, the AMF 2 includes in the UE Configuration Update Command message an information element indicating a grace period before these PDU sessions are released. This information element may be the value of a timer that is used to determine the expiration of the grace period. The AMF 2 may start the timer upon being triggered by the transmission of the UE Configuration Update Command message. Alternatively, the AMF 2 may start the timer upon being triggered by the reception of a response message to the UE Configuration Update Command message (e.g., a UE Configuration Update Complete message).

If the timer for measuring the grace period has expired (step 405), the AMF 2 invokes an Nsmf_PDUSession_UpdateSMContext (or Nsmf_PDUSession_ReleaseSMContext) service operation to release all the PDU sessions of the UE 1 associated with S-NSSAI #1 (step 406). More specifically, the AMF 2 sends an Nsmf_PDUSession_UpdateSMContext message (or an Nsmf_PDUSession_ReleaseSMContext message) to the SMF 3. As mentioned above, the message may contain a cause IE indicating the revocation of the S-NSSAI (or network slice) authorization (e.g., REL_DUE_TO_SLICE_REVOCATION). If the AMF 2 receives from the UE 1 the start of the procedure to release the PDU session before the timer for measuring the grace period expires, it may stop the timer and terminate the network-requested PDU session release procedure.

The procedure in FIG. 4 allows the AMF 2 to inform the UE 1 that PDU sessions associated with the network slice whose authorization has been revoked will be released after a grace period has elapsed.

Figure 5:
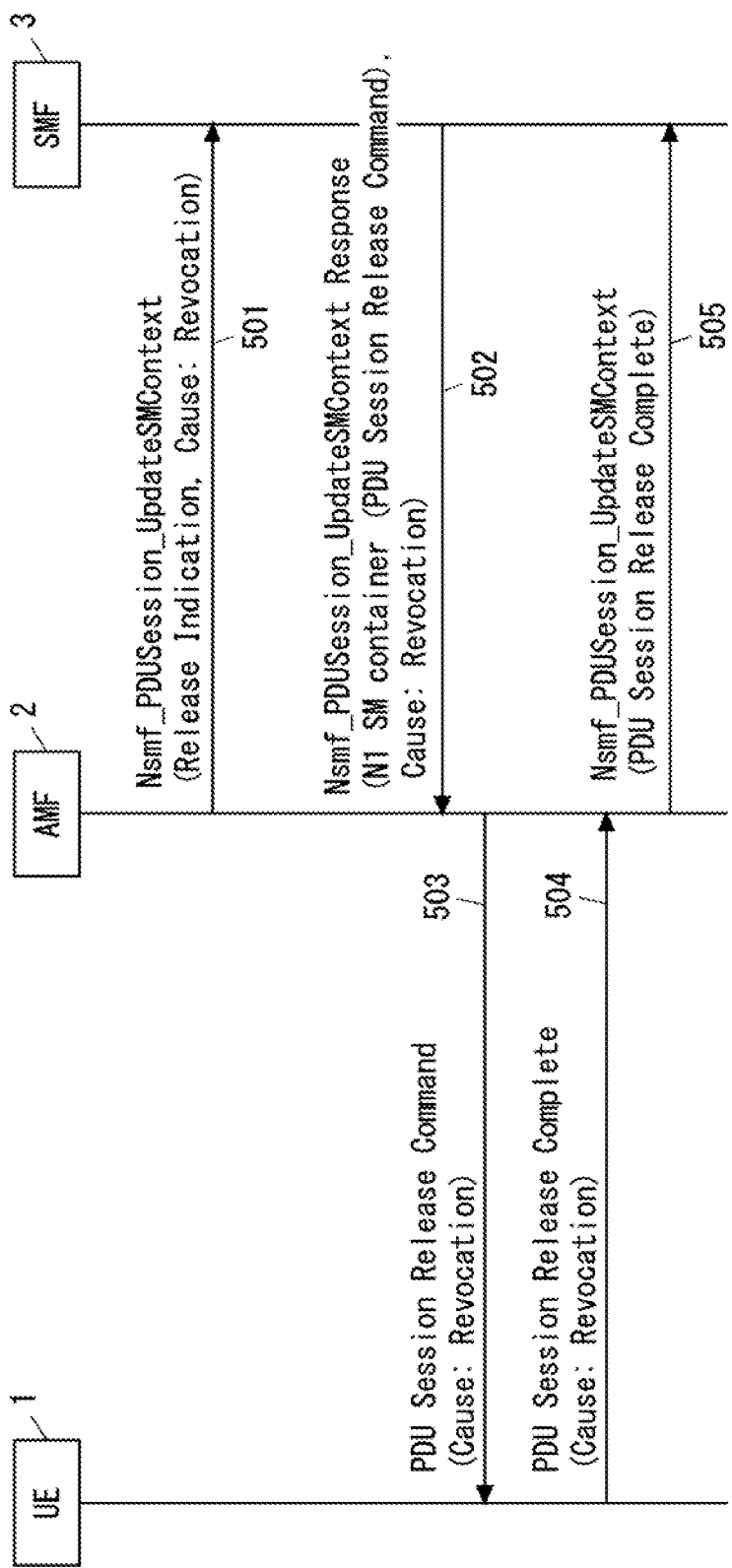
FIG. 5 is a sequence diagram showing an example of operations of a UE, an AMF and an SMF according to an embodiment.

FIG. 5 shows an example of the PDU session release procedure. In step 501, the AMF 2 sends a message (e.g., Nsmf_PDUSession_UpdateSMContext message, or Nsmf_PDUSession_ReleaseSMContext message) to the SMF 3 to request the release of a PDU session associated with a network slice whose authorization has been revoked. This message contains a Release Indication and a cause IE indicating the revocation of the S-NSSAI (or network slice) authorization (e.g., REL_DUE_TO_SLICE_REVOCATION).

The AMF 2 may inform the SMF 3 of the PDU session IDs of one or more PDU sessions associated with that S-NSSAI in order to invoke the network-requested PDU session release procedure. The AMF 2 may include these PDU session IDs in the above message, or may notify these PDU session IDs to the SMF 3 by a separate message. The AMF 2 may include the S-NSSAI in the above message, or may notify the SMF 3 of the S-NSSAI by a separate message. Step 501 corresponds to step 304 in FIG. 3 or step 406 in FIG. 4.

In step 502, the SMF 3 sends a response message to the AMF 2. For example, the SMF 3 may respond to the AMF 2 with an Nsmf_PDUSession_UpdateSMContext Response message or an Nsmf_PDUSession_ReleaseSMContext Response message. This message contains an N1 SM container containing a PDU Session Release Command. The message may also contain a cause IE indicating the revocation of the S-NSSAI (or network slice) authorization (e.g., REL_DUE_TO_SLICE_REVOCATION). Additionally or alternatively, the PDU Session Release Command may contain a SGSM Cause IE indicating the revocation of the S-NSSAI (or network slice) authorization (or that the S-NSSAI is not available).

In step 503, the AMF 2 sends a NAS message including the N1 SM container containing the PDU Session Release Command to the UE 1 via the AN 5. The PDU Session Release Command may contain a SGSM Cause IE indicating the revocation of the S-NSSAI (or network slice) authorization (or that the S-NSSAI is not available).

In step 504, the UE 1 sends a NAS message containing a PDU Session Release Complete to the AMF 2 in order to acknowledge the PDU Session Release Command. The PDU Session Release Complete may contain a SGSM Cause IE indicating the revocation of the S-NSSAI (or network slice) authorization (or that the S-NSSAI is not available).

In step 505, the AMF 2 performs (or invokes) an Nsmf_PDUSession_UpdateSMContext service operation and forwards the N1 SM container (PDU Session Release Complete) to the SMF 3.

Second Embodiment

A configuration example of a cellular network for this embodiment may be the same as the example shown in FIG. 1. This embodiment provides another example of the operation of the AMF 2 when the authorization of a network slice has been revoked.

Figure 6:
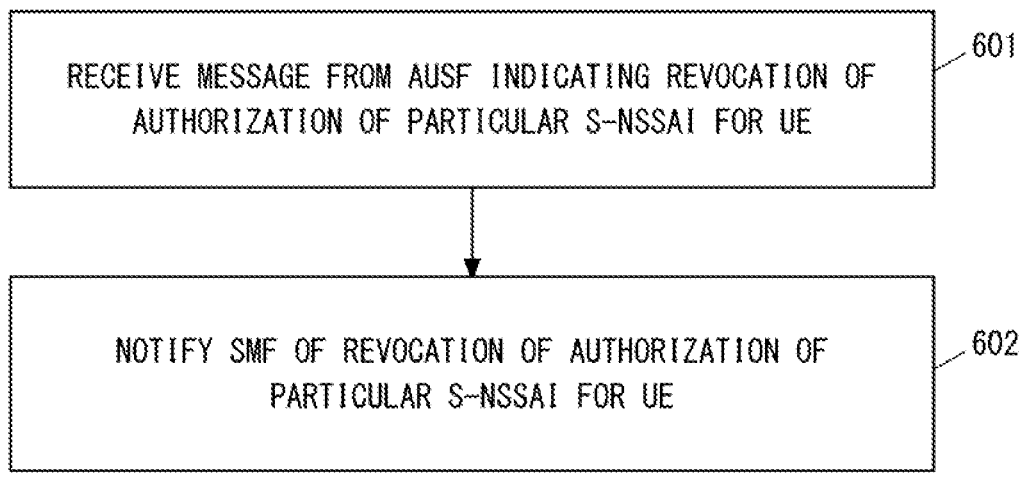
FIG. 6 is a flowchart showing an example of operation of an AMF according to an embodiment.

FIG. 6 is a flowchart showing an example of the operation of the AMF 2. Step 601 is similar to step 201 in FIG. 2. That is, the AMF 2 receives a message from the AUSF 4 indicating the revocation of the authorization of a particular S-NSSAI (or network slice identified thereby) for a UE. In step 602, the AMF 2 notifies the SMF 3 of the revocation of the authorization of the particular S-NSSAI (or the network slice identified thereby) for the UE. Upon receiving the notification message (step 602) from the AMF 2, the SMF 3 decides to release a PDU session associated with the particular S-NSSAI.

If a PDU session for an emergency call (e.g., Emergency Service) associated with that particular S-NSSAI has been established, the AMF 2 may be configured to exclude the release of the PDU session for the emergency call from the above release procedure. In other words, in the above release procedure, the AMF 2 may initiate a release procedure to release all the PDU sessions associated with that particular S-NSSAI other than the PDU sessions for emergency calls. A PDU session for emergency call associated with the particular S-NSSAI may mean a PDU session for emergency call in which the particular S-NSSAI is set in the AMF emergency configuration data stored by the AMF 2, the S-NSSAI is notified from the AMF 2 to the SMF 3, and the S-NSSAI is used by the SMF 3 at the time of establishing the PDU session.

The operation shown in FIG. 6 allows the AMF 2 to notify the SMF 3 of the revocation of the authorization of a network slice, thereby assisting the SMF 3 to release a PDU session associated with the network slice whose authorization has been revoked.

Third Embodiment

A configuration example of a cellular network according to this embodiment may be the same as the example shown in FIG. 1. This embodiment provides an example of the operation of the UE 1 when the authorization of a network slice has been revoked.

Figure 7:
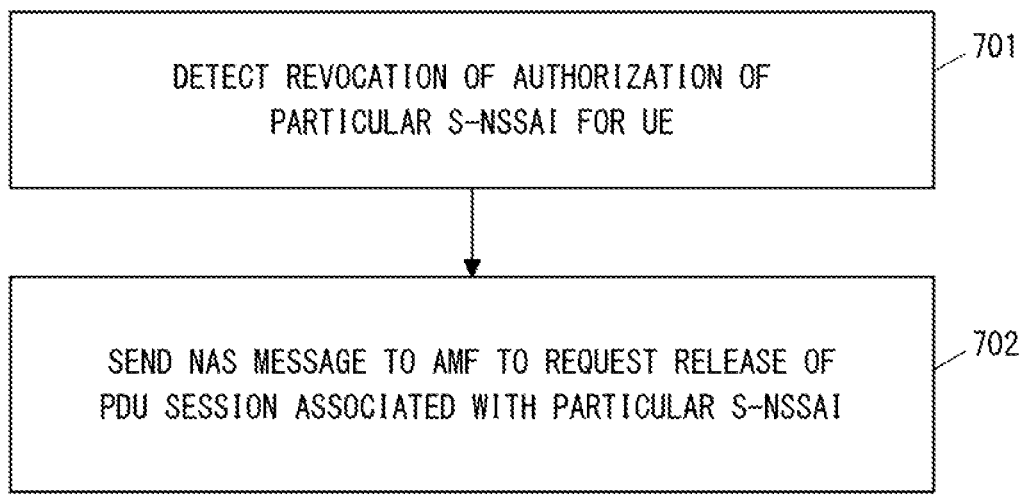
FIG. 7 is a flowchart showing an example of operation of a UE according to an embodiment.

FIG. 7 is a flowchart showing an example of the operation of the UE 1. In step 701, the UE 1 detects (or recognizes) the revocation of the authorization of a particular S-NSSAI (or network slice identified thereby) for the UE 1. For example, if the UE 1 receives a UE Configuration Update Command message from the AMF 2 indicating that a particular S-NSSAI is to be removed from the Allowed NSSAI and is to be included in the Rejected NSSAI, it may detect (or recognize) the revocation of the authorization of that particular S-NSSAI. Additionally or alternatively, if the UE 1 receives from the AMF 2 a NAS message that contains an information element indicating the revocation of the authorization of a particular S-NSSAI, it may detect (or recognize) the revocation of the authorization of that particular S-NSSAI.

In step 702, in response to the revocation of the authorization of the particular S-NSSAI (or network slice identified thereby) for the UE 1, the UE 1 requests the network to release a PDU session(s) associated with the particular S-NSSAI. Specifically, the UE 1 sends a NAS message to the AMF 2 to request the release of a PDU session(s) associated with that particular S-NSSAI. More specifically, the NAS-MM layer of the UE 1 notifies the NAS-SM layer of the UE 1 of the revocation of the authorization for the particular S-NSSAI. The NAS-SM layer of the UE 1 generates a PDU Session Release Request for a PDU session associated with the particular S-NSSAI for which the authorization has been revoked, in response to the notification from the lower layer (NAS-MM layer). The NAS-SM layer of the UE 1 passes the generated PDU Session Release Request together with the PDU Session ID to the NAS-MM layer. The NAS-MM layer of the UE 1 sends a NAS message containing the PDU Session ID and the N1 SM container (PDU Session Release Request) to the AMF 2. One or both of the NAS message and the PDU Session Release Request may contain a cause information element indicating the revocation of the S-NSSAI authorization.

The operation shown in FIG. 7 allows the UE 1 to quickly release a PDU session(s) associated with a network slice whose authorization has been revoked.

Figure 8:
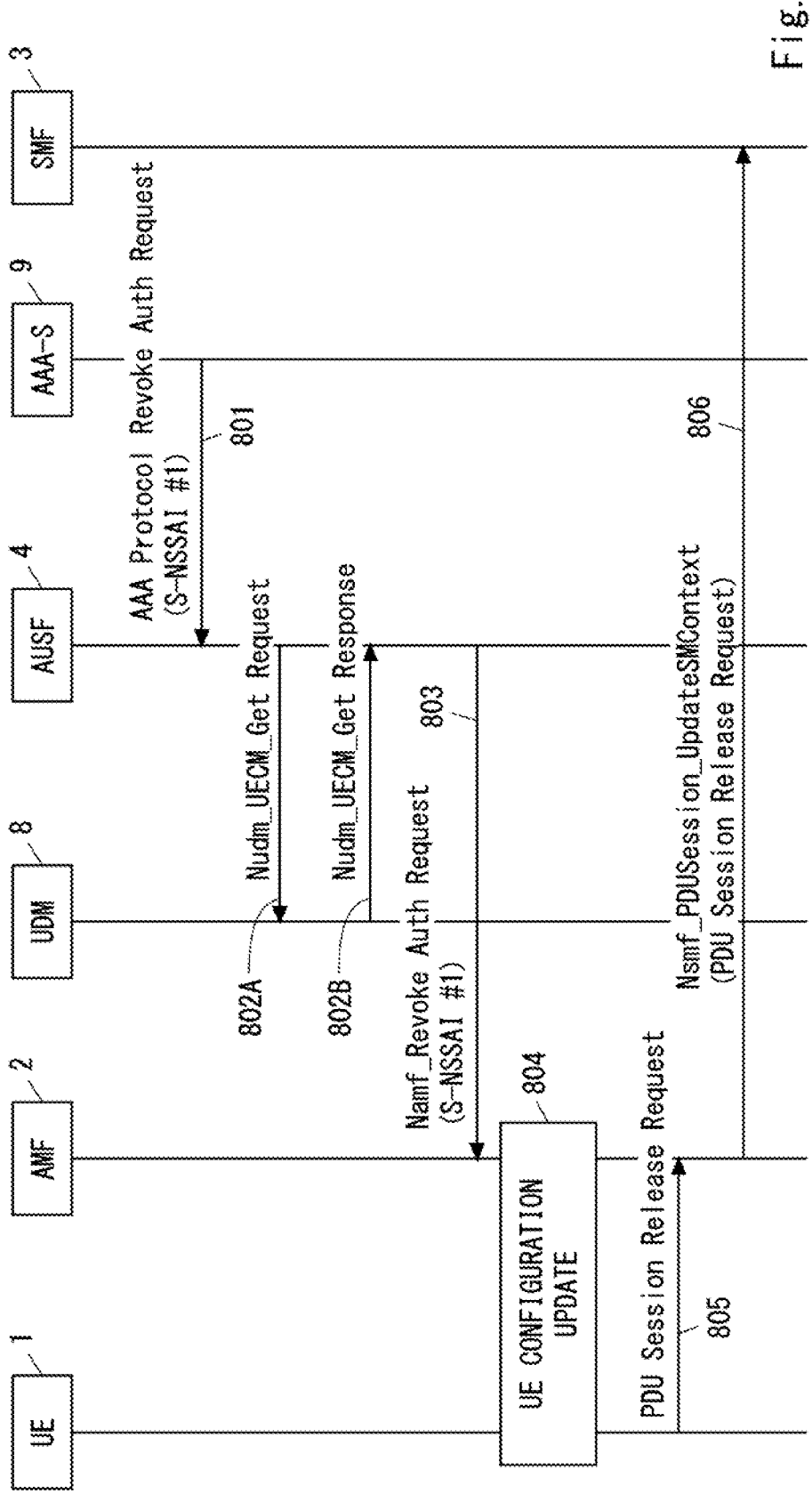
FIG. 8 is a sequence diagram showing an example of operations of a UE, an AMF and an AUSF according to an embodiment.

FIG. 8 shows an example of a Slice-Specific Authorization Revocation procedure that is initiated (or triggered) by the AAA-S. Steps 801-804 may be the same as those in the existing procedure. The existing Slice-Specific Authorization Revocation procedure initiated (or triggered) by AAA-S are described in section 4.2.9.4 of Non-Patent Literature 2 (or in Non-Patent Literature 5).

In step 801, the AAA-S 9 sends a Revoke Authorization Request message (e.g., AAA Protocol Revoke-Auth Request message) to the AUSF 4 to request revocation of the authorization for a network slice identified by a particular S-NSSAI (in this case, S-NSSAI #1). This message indicates S-NSSAI #1 and further indicates the Generic Public Subscription Identifier (GPSI) of the UE 1. The message may be sent directly from the AAA-S 9 to the AUSF 4, or may be sent to the AUSF 4 via an AAA Proxy (AAA-P) not illustrated.

In step 803, the AUSF 4 notifies the AMF 2 via an NF service provided by the AUSF 4 that a revocation event of S-NSSAI #1 authorization for the UE 1 has occurred. Specifically, the AUSF 4 obtains the AMF ID indicating the AMF 2 from the UDM 8 by invoking a procedure (e.g., Nudm_UECM_Get procedure) using the GPSI of the UE 1 contained in the message received in step 801 (steps 802A and 802B). The AUSF 4 may then send a message (e.g., Nausf_NSSAA_Notify message) to the AMF 2 indicated by the AMF ID, indicating that a revocation event of the authorization of S-NSSAI #1 for the UE 1 has occurred. The notification message from the AUSF 4 to the AMF 2 indicates S-NSSAI #1 and further indicates the GPSI of the UE 1.

In step 804, the AMF 2 signals the UE 1 to update the UE NSSAI configuration (NSSAI storage) in order to remove S-NSSAI #1, whose authorization has been revoked, from the current allowed NSSAI. Specifically, the AMF 2 sends to the UE 1 a UE Configuration Update Command message indicating that S-NSSAI #1 is to be removed from the Allowed NSSAI and that this is to be included in the Rejected NSSAI. In response to the reception of the UE Configuration Update Command message, the UE 1 updates its UE NSSAI configuration (NSSAI storage) stored in a (non-volatile) memory of the UE 1. Specifically, the UE 1 removes S-NSSAI #1 from the Allowed NSSAI in the UE NSSAI configuration (NSSAI storage) and stores it in the Rejected NSSAI. The UE Configuration Update Command message may contain a cause IE indicating the revocation of the S-NSSAI (or network slice) authorization. The cause IE may be, for example, "S-NSSAI is not available due to the failed or revoked network slice-specific authorization and authentication".

In step 805, in response to detecting the revocation of the authorization of S-NSSAI #1, the UE 1 requests the network to release a PDU session(s) associated with S-NSSAI #1. Specifically, the UE 1 sends to the AMF 2 a NAS message containing the PDU Session ID(s) of the PDU session(s) associated with SNSSAI #1 and an N1 SM container (PDU Session Release Request). As mentioned above, one or both of the NAS message and the PDU Session Release Request may contain a cause IE indicating the revocation of S-NSSAI authorization.

In step 806, the AMF 2 invokes an Nsmf_PDUSession_UpdateSMContext service operation and forwards the N1 SM container (PDU Session Release Request) to the SMF 3.

Figure 9:
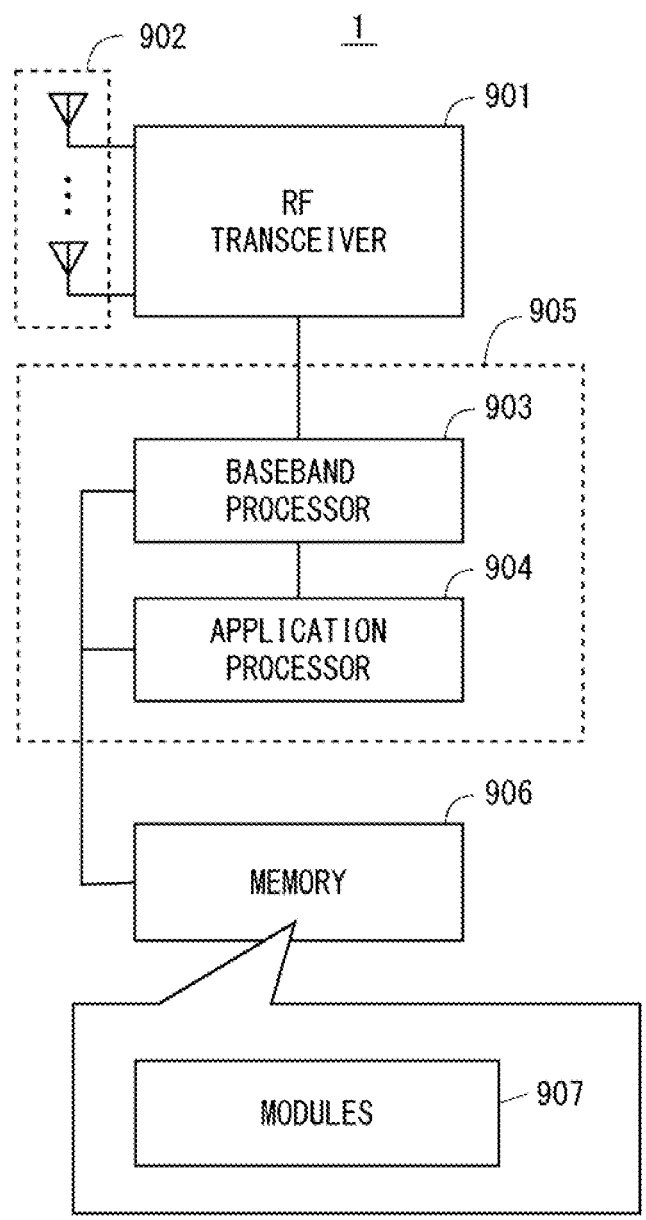
FIG. 9 is a block diagram showing a configuration example of a UE according to an embodiment.

The following provides configuration examples of the UE 1, AMF 2, and SMF 3 according to the above-described embodiments. FIG. 9 is a block diagram showing a configuration example of the UE 1. A Radio Frequency (RF) transceiver 901 performs analog RF signal processing to communicate with NG-RAN nodes. The RF transceiver 901 may include a plurality of transceivers. The analog RF signal processing performed by the RF transceiver 901 includes frequency up-conversion, frequency down-conversion, and amplification. The RF transceiver 901 is coupled to an antenna array 902 and a baseband processor 903. The RF transceiver 901 receives modulated symbol data (or OFDM symbol data) from the baseband processor 903, generates a transmission RF signal, and supplies the transmission RF signal to the antenna array 902. Further, the RF transceiver 901 generates a baseband reception signal based on a reception RF signal received by the antenna array 902 and supplies the baseband reception signal to the baseband processor 903. The RF transceiver 901 may include an analog beamformer circuit for beam forming. The analog beamformer circuit includes, for example, a plurality of phase shifters and a plurality of power amplifiers.

The baseband processor 903 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 903 may include, for example, signal processing of a Service Data Adaptation Protocol (SDAP) layer, a Packet Data Convergence Protocol (PDCP) layer, a Radio Link Control (RLC) layer, a Medium Access Control (MAC) layer, and a Physical (PHY) layer. Further, the control-plane processing performed by the baseband processor 903 may include processing of Non-Access Stratum (NAS) protocols, Radio Resource Control (RRC) protocols, and MAC Control Elements (CEs).

The baseband processor 903 may perform Multiple Input Multiple Output (MIMO) encoding and pre-coding for beam forming.

The baseband processor 903 may include a modem processor (e.g., Digital Signal Processor (DSP)) that performs the digital baseband signal processing and a protocol stack processor (e.g., a Central Processing Unit (CPU) or a Micro Processing Unit (MPU)) that performs the control-plane processing. In this case, the protocol stack processor, which performs the control-plane processing, may be integrated with an application processor 904 described in the following.

The application processor 904 is also referred to as a CPU, an MPU, a microprocessor, or a processor core. The application processor 904 may include a plurality of processors (or processor cores). The application processor 904 loads a system software program (Operating System (OS)) and various application programs (e.g., a call application, a WEB browser, a mailer, a camera operation application, and a music player application) from a memory 906 or from another memory (not illustrated) and executes these programs, thereby providing various functions of the UE 1.

In some implementations, as represented by a dashed line (905) in FIG. 9, the baseband processor 903 and the application processor 904 may be integrated on a single chip. In other words, the baseband processor 903 and the application processor 904 may be implemented in a single System on Chip (SoC) device 905. An SoC device may be referred to as a Large-Scale Integration (LSI) or a chipset.

The memory 906 is a volatile memory, a non-volatile memory, or a combination thereof. The memory 906 may include a plurality of memory devices that are physically independent from each other. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 906 may include, for example, an external memory device that can be accessed from the baseband processor 903, the application processor 904, and the SoC 905. The memory 906 may include an internal memory device that is integrated in the baseband processor 903, the application processor 904, or the SoC 905. Further, the memory 906 may include a memory in a Universal Integrated Circuit Card (UICC).

The memory 906 may store one or more software modules (computer programs) 907 including instructions and data to perform the processing by the UE 1 described in the above embodiments. In some implementations, the baseband processor 903 or the application processor 904 may load these software modules 907 from the memory 906 and execute the loaded software modules, thereby performing the processing of the UE 1 described in the above embodiments with reference to the drawings.

The control-plane processing and operations performed by the UE 1 described in the above embodiments can be achieved by elements other than the RF transceiver 901 and the antenna array 902, i.e., achieved by the memory 906, which stores the software modules 907, and one or both of the baseband processor 903 and the application processor 904.

Figure 10:
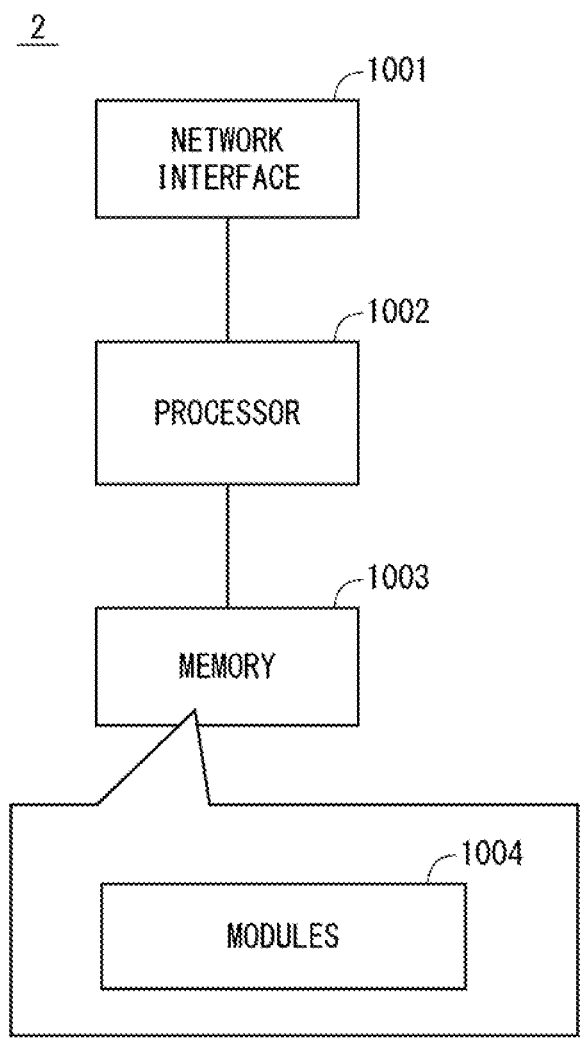
FIG. 10 is a block diagram showing a configuration example of an AMF according to an embodiment.

FIG. 10 shows a configuration example of the AMF 2. The SMF 3 may also be configured as shown in FIG. 10. Referring to FIG. 10, the AMF 2 includes a network interface 1001, a processor 1002, and a memory 1003. The network interface 1001 is used to communicate, for example, with RAN nodes and with other network functions (NFs) or nodes in the 5GC. The other NFs or nodes in the 5GC include, for example, UDM, AUSF, SMF, and PCF. The network interface 1001 may include, for example, a network interface card (NIC) conforming to the IEEE 802.3 series.

The processor 1002 may be, for example, a microprocessor, a Micro Processing Unit (MPU), or a Central Processing Unit (CPU). The processor 1002 may include a plurality of processors.

The memory 1003 is composed of a volatile memory and a nonvolatile memory. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 1003 may include a storage located apart from the processor 1002. In this case, the processor 1002 may access the memory 1003 via the network interface 1001 or an I/O interface (not illustrated).

The memory 1003 may store one or more software modules (computer programs) 1004 including instructions and data to perform the processing of the AMF 2 described in the above embodiments. In some implementations, the processor 1002 may be configured to load the one or more software modules 1004 from the memory 1003 and execute the loaded software modules, thereby performing the processing of the AMF 2 described in the above embodiments.

As described above with reference to FIGS. 9 and 10, each of the processors that the UE 1, AMF 2 and SMF 3 according to the above embodiments include executes one or more programs including instructions for causing a computer to execute an algorithm described with reference to the drawings. These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). These programs may be provided to a computer using any type of transitory computer readable media. Examples of transitory computer readable media include electric signals, optical signals, and electromagnetic waves. Transitory computer readable media can provide the programs to a computer via a wired communication line (e.g., electric wires, and optical fibers) or a wireless communication line.

The User Equipment (UE) in the present disclosure is an entity to be connected to a network via a wireless interface. It should be noted that the radio terminal (UE) in the present disclosure is not limited to a dedicated communication device, and it may be any device as follows having the communication functions herein explained.

The terms "User Equipment (UE)" (as the term is used by 3GPP), "mobile station", "mobile terminal", "mobile device", and "radio terminal (wireless device)" are generally intended to be synonymous with one another. The UE may include standalone mobile stations, such as terminals, cell phones, smartphones, tablets, cellular IoT (internet of things) terminals, and IoT devices. It will be appreciated that the terms "UE" and "radio terminal" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper projecting machinery; chemical machinery; mining and/or construction machinery and/or related equipment; machinery and/or implements for agriculture, forestry and/or fisheries; safety and/or environment preservation equipment; tractors; bearings; precision bearings; chains; gears; power transmission equipment; lubricators; valves; pipe fittings; and/or application systems for any of the previously mentioned equipment or machinery etc.).

A UE may, for example, be an item of transport equipment (for example transport equipment such as: rolling stocks; motor vehicles; motorcycles; bicycles; trains; buses; carts;

rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be an item of refrigeration equipment, a refrigeration application product and equipment, trade and/or service industry equipment, a vending machine, an automatic service machine, an office machine or equipment, a consumer electronic and electronic appliance (for example a consumer electronic appliance such as: audio equipment; a speaker; a radio; video equipment; a television; an oven range; a rice cooker; a coffee maker; a dishwasher; a washing machine; dryers, a fan, an exhaust fan and related products, a vacuum cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies. Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g., vehicles) or attached to animals or persons to be monitored/tracked. It will be appreciated that IoT technology can be implemented on any communication devices that can connect to a communications network for sending/receiving data, regardless of whether such communication devices are controlled by human input or software instructions stored in memory. It will be appreciated that IoT devices are sometimes also referred to as Machine-Type Communication (MTC) devices, Machine-to-Machine (M2M) communication devices, or Narrow Band-IoT (NB-IoT) UE.

It will be appreciated that a UE may support one or more IoT or MTC applications.

Some examples of MTC applications are listed in 3GPP TS 22.368 V13.2.0 (2017-01-13), Annex B (the contents of which are incorporated herein by reference). This list is not exhaustive and is intended to be indicative of some examples of MTC applications. In this list, the Service Area of the MTC applications includes Security, Tracking & Tracing, Payment, Health, Remote Maintenance/Control, Metering, and Consumer Devices.

Examples of the MTC applications regarding Security include Surveillance systems, Backup for landline, Control of physical access (e.g., to buildings), and Car/driver security.

Examples of the MTC applications regarding Tacking & Tracing include Fleet Management, Order Management, Telematics insurance: Pay as you drive (PAYD), Asset Tracking, Navigation, Traffic information, Road tolling, and Road traffic optimisation/steering.

Examples of the MTC applications regarding Payment include Point of sales (POS), Vending machines, and Gaming machines.

Examples of the MTC applications regarding Health include Monitoring vital signs, Supporting the aged or handicapped, Web Access Telemedicine points, and Remote diagnostics.

Examples of the MTC applications regarding Remote Maintenance/Control include Sensors, Lighting, Pumps, Valves, Elevator control, Vending machine control, and Vehicle diagnostics.

Examples of the MTC applications regarding Metering include Power, Gas, Water, Heating, Grid control, and Industrial metering.

Examples of the MTC applications regarding Consumer Devices include Digital photo frame, Digital camera, and eBook.

Applications, services, and solutions may be an Mobile Virtual Network Operator (MVNO) service/system, an emergency radio communication service/system, a Private Branch eXchange (PBX) service/system, a PHS/Digital Cordless Telecommunications service/system, a Point of sale (POS) service/system, an advertise calling service/system, a Multimedia Broadcast and Multicast Service (MBMS) service/system, a Vehicle to Everything (V2X) service/system, a train radio service/system, a location related service/system, a Disaster/Emergency Wireless Communication Service/system, an Internet of Things (IoT) service/system, a community service/system, a video streaming service/system, a femto cell application service/system, a Voice over LTE (VoLTE) service/system, a radio tag service/system, a charging service/system, a radio on demand service/system, a roaming service/system, an activity monitoring service/system, a telecom carrier/communication NW selection service/system, a functional restriction service/system, a Proof of Concept (PoC) service/system, a personal information management service/system, a display video service/system, a non-communication service/system, an ad-hoc network/Delay Tolerant Networking (DTN) service/system, etc.

The above-described UE categories are merely examples of applications of the technical ideas and embodiments described in the present disclosure. The UE described in this disclosure is not limited to these examples and various modifications can be made thereto by those skilled in the art.

The above-described embodiments are merely examples of applications of the technical ideas obtained by the inventors. These technical ideas are not limited to the above-described embodiments and various modifications can be made thereto.

The whole or part of the embodiments disclosed above can be described as, but not limited to, the following supplementary notes.

(Supplementary Note 1)

An Access and Mobility Management Function (AMF) node comprising:
  at least one memory; and
  at least one processor coupled to the at least one memory and configured to:
    in response to revocation of authorization of a first network slice identifier for a User Equipment (UE), initiate a release procedure to release a Protocol Data Unit (PDU) session associated with the first network slice identifier.

(Supplementary Note 2)

The AMF node according to Supplementary Note 1, wherein the at least one processor is configured to notify a Session Management Function (SMF) of the revocation of the authorization of the first network slice identifier for the UE in the release procedure.

(Supplementary Note 3)

The AMF node according to Supplementary Note 2, wherein the at least one processor is configured to send a message to the SMF to request release of a Session Management (SM) context for the PDU session in the release procedure,
  wherein the message contains a cause information element indicating the revocation of the authorization.

(Supplementary Note 4)

The AMF node according to any one of Supplementary Notes 1 to 3, wherein the at least one processor is configured to, in response to the revocation of the authorization, send to the UE a Non-Access Stratum (NAS) message instructing the UE to update a UE configuration,
  wherein the NAS message indicates that the first network slice identifier is to be removed from a set of allowed network slice identifiers indicating one or more network slice identifiers currently allowed to the UE, and that the first network slice identifier is to be included in a set of rejected network slice identifiers, and
  wherein the NAS message further indicates a grace period before the PDU session is released.

(Supplementary Note 5)

The AMF node according to Supplementary Note 4, wherein the at least one processor is configured to initiate the release procedure after the grace period has expired.

(Supplementary Note 6)

The AMF node according to any one of any one of Supplementary Notes 1 to 5, wherein the at least one processor is configured to initiate the release procedure in response to receiving a message indicating the revocation of the authorization from an Authentication Server Function (AUSF).

(Supplementary Note 7)

The AMF node according to any one of Supplementary Notes 1 to 6, wherein the first network slice identifier is a Single Network Slice Selection Assistance Information (S-NSSAI).

(Supplementary Note 8)

A method in an Access and Mobility Management Function (AMF) node, the method comprising:
  in response to revocation of authorization of a first network slice identifier for a User Equipment (UE), initiating a release procedure to release a Protocol Data Unit (PDU) session associated with the first network slice identifier.

(Supplementary Note 9)

A program for causing a computer to perform a method in an Access and Mobility Management Function (AMF) node, the method comprising:
  in response to revocation of authorization of a first network slice identifier for a User Equipment (UE), initiating a release procedure to release a Protocol Data Unit (PDU) session associated with the first network slice identifier.

(Supplementary Note 10)

A User Equipment (UE) comprising:
  at least one memory; and
  at least one processor coupled to the at least one memory and configured to:
    in response to revocation of authorization of a first network slice identifier for the UE, request a network to release a PDU session associated with the first network slice identifier.

(Supplementary Note 11)

The UE according to Supplementary Note 10, wherein the at least one processor is configured to send a first Non-Access Stratum (NAS) message to an Access and Mobility Management Function (AMF) to request release of the PDU session,
  wherein the first NAS message includes a cause information element indicating the revocation of the authorization.

(Supplementary Note 12)

The UE according to Supplementary Note 10 or 11, wherein
  the at least one processor is configured to receive from an Access and Mobility Management Function (AMF) a second Non-Access Stratum (NAS) message indicating an update of a UE configuration,
  the second NAS message indicates that the first network slice identifier is to be removed from a set of allowed network slice identifiers indicating one or more network slice identifiers currently allowed to the UE, and that the first network slice identifier is to be included in a set of rejected network slice identifiers, and
  the at least one processor is configured to detect the revocation of the authorization based on the second NAS message.

(Supplementary Note 13)

A method in a User Equipment (UE), the method comprising:
  in response to revocation of authorization of a first network slice identifier for the UE, requesting a network to release a PDU session associated with the first network slice identifier.

(Supplementary Note 14)

A program for causing a computer to perform a method in a User Equipment (UE), the method comprising:
  in response to revocation of authorization of a first network slice identifier for the UE, requesting a network to release a PDU session associated with the first network slice identifier.

This application is based upon and claims the benefit of priority from Japanese Patent Application No. 2019-237392, filed on Dec. 26, 2019, the disclosure of which is incorporated herein in its entirety by reference.

REFERENCE SIGNS LIST

1 UE
2 AMF
3 SMF
4 AUSF
5 AN
6 UPF
7 DN

8 UDM
9 AAA-S
903 Baseband Processor
904 Application Processor
906 Memory
907 Modules
1002 Processor
1003 Memory
1004 Modules

What is claimed is:

1. A first communication apparatus comprising:
a memory; and
at least one processor coupled to the memory and configured to:
receive, from a second communication apparatus, a first message indicating revocation of an authorization of a first Single Network Slice Selection Assistance Information (S-NSSAI) for a User Equipment (UE);
send, to a Session Management Function (SMF), a second message requesting to release a Protocol Data Unit (PDU) session after the first communication apparatus receives the first message; and
send, to the UE, a UE Configuration Update Command message in a case where the authorization is revoked,
wherein the second message includes a first cause information element indicating the revocation of the authorization,
wherein the PDU session is associated to the first S-NSSAI,
wherein the UE Configuration Update Command message includes a second cause information element indicating the revocation of the authorization, and
wherein the UE Configuration Update Command message includes a timer indicating a period to control a Protocol Data Unit (PDU) session for the first S-NSSAI.

2. The first communication apparatus according to claim 1, wherein the UE Configuration Update Command message indicates that the first S-NSSAI is to be removed from a set of allowed network slice identifiers indicating at least one S-NSSAI currently allowed to the UE, and that the first S-NSSAI is included in a set of rejected network slice identifiers.

3. The first communication apparatus according to claim 1, wherein the at least one processor is configured to send a third message indicating release of the PDU session to the UE, after the first communication apparatus receives the first message, and
wherein the third message indicating the release of the PDU session includes a third cause information element indicating the revocation of the authorization.

4. The first communication apparatus according to claim 1, wherein the second communication apparatus is an Authentication Server Function configured to provide a Network Slice-Specific Authentication and Authorization service.

5. A method in a first communication apparatus, the method comprising:
receiving, from a second communication apparatus, a first message indicating revocation of an authorization of a first Single Network Slice Selection Assistance Information (S-NSSAI) for a User Equipment (UE);
sending, to a Session Management Function (SMF), a second message requesting to release a Protocol Data Unit (PDU) session after the receiving the first message; and
sending, to the UE, a UE Configuration Update Command message in a case where the authorization is revoked,
wherein the second message includes a first cause information element indicating the revocation of the authorization,
wherein the PDU session is associated to the first S-NSSAI,
wherein the UE Configuration Update Command message includes a second cause information element indicating the revocation of the authorization, and
wherein the UE Configuration Update Command message includes a timer indicating a period to control a Protocol Data Unit (PDU) session for the first S-NSSAI.

6. The method according to claim 5, wherein the UE Configuration Update Command message indicates that the first S-NSSAI is to be removed from a set of allowed network slice identifiers indicating at least one S-NSSAI currently allowed to the UE, and that the first S-NSSAI is included in a set of rejected network slice identifiers.

7. The method according to claim 5, further comprising sending a third message indicating release of the PDU session to the UE after receiving the first message,
wherein the third message indicating the release of the PDU session includes a third cause information element indicating the revocation of the authorization.

8. The method according to claim 5, wherein the second communication apparatus is an Authentication Server Function that provides a Network Slice-Specific Authentication and Authorization service.

9. A method of a user equipment (UE), the method comprising:
receiving, from an Access and Mobility Management Function (AMF), a UE Configuration Update Command message in a case where an authorization of a first Single Network Slice Selection Assistance Information (S-NSSAI) for the UE is revoked; and
removing, from an Allowed NSSAI in the UE, the first S-NSSAI in a case where the first S-NSSAI is included in Rejected Network Slice Selection Assistance Information (NSSAI),
wherein the UE Configuration Update Command message includes a cause information element indicating that the authorization is revoked,
wherein the UE Configuration Update Command message indicates that the first S-NSSAI is included in the Rejected NSSAI, and
wherein the UE Configuration Update Command message includes a timer indicating a period to control a Protocol Data Unit (PDU) session for the first S-NSSAI.

* * * * *